March 12, 1957     K. H. WEIR     2,784,576
POWER TRANSMISSION APPARATUS
Filed March 6, 1956     2 Sheets-Sheet 1

*INVENTOR:*
KENNETH H. WEIR
BY
ATT'YS

March 12, 1957  K. H. WEIR  2,784,576
POWER TRANSMISSION APPARATUS
Filed March 6, 1956
2 Sheets-Sheet 2
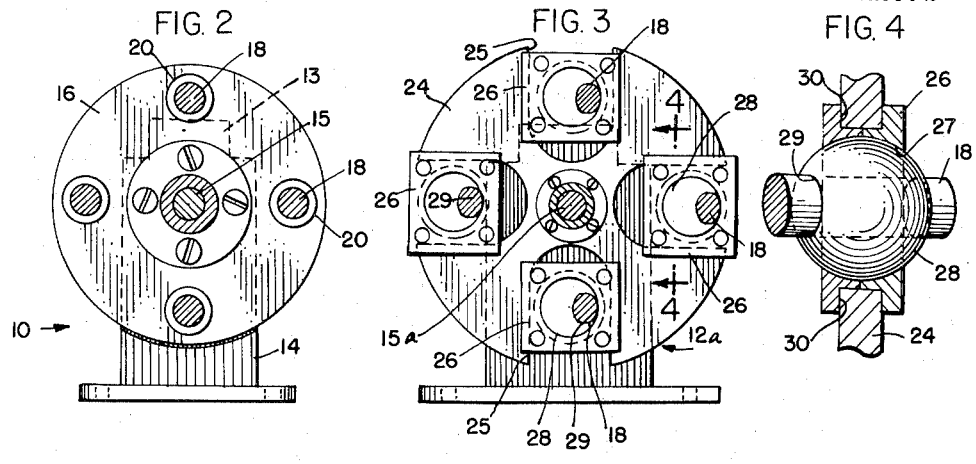
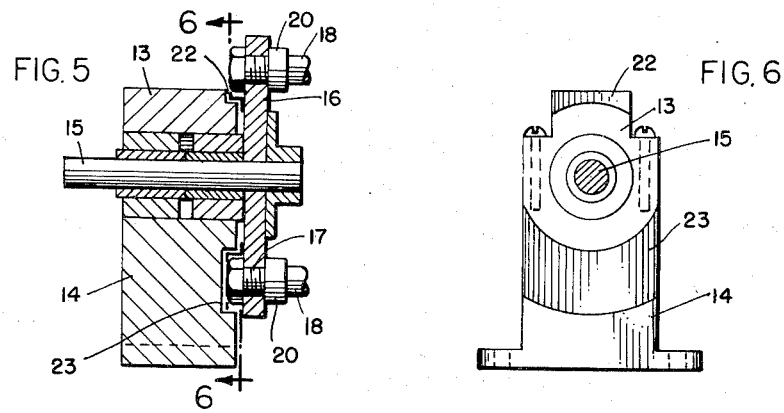
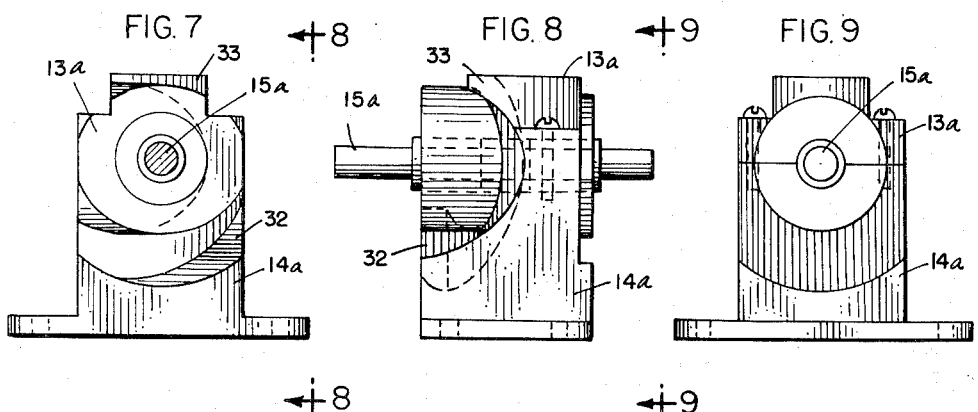
INVENTOR:
KENNETH H. WEIR
BY
Rummler, Rummler & Snow
ATT'YS

United States Patent Office 2,784,576
Patented Mar. 12, 1957

2,784,576
POWER TRANSMISSION APPARATUS
Kenneth H. Weir, Santa Ana, Calif.

Application March 6, 1956, Serial No. 569,722

10 Claims. (Cl. 64—20)

This invention relates to mechanical power transmission apparatus and more particularly to apparatus for transmitting power at an angle to the axis of the driving shaft without the use of conventional gearing.

Heretofore, axially angular transmission of power has been effected principally by bevel gears. A disadvantage of such an arrangement is that the torque transmitted is sustained only by the strength of a few of the gear teeth at any particular moment and, furthermore, arrangements of such kind are characterized by backlash and excessive noise. Other apparatus, involving circumferentially spaced axially extending bars or rods for engagement with a radially slotted disc or spoked wheel have been proposed but, like bevel gears, have exhibited considerable backlash and excessive noise.

A principal object of this invention, therefore, is to provide a power transmission apparatus wherein angular transmission of power is effected with no backlash and with a minimum of noise.

A further object of the invention is to provide apparatus of the stated type which is characterized by efficiency of operation, ease of manufacture and facility of use for substantially any degree of axial angularity in the transmission train.

Other and further objects, advantages and features of the present invention will be apparent to those skilled in the art from the following description, taken in conjunction with the accompanying drawings in which a specific embodiment of this invention is shown in which:

Fig. 2 is an elevational view, partly in section, taken substantially on line 2—2 of Fig. 1, showing the front end of a driving unit;

Fig. 3 is a vertical view, partly in section, taken substantially on line 3—3 of Fig. 1, showing the rearward end of a driven unit;

Fig. 4 is a vertical sectional view taken substantially on line 4—4 of Fig. 3;

Fig. 5 is an elevational view, in section, taken substantially on line 5—5 of Fig. 1;

Fig. 6 is an elevational view, partly in section, taken substantially on line 6—6 of Fig. 5;

Fig. 7 is an elevational view, taken substantially on line 7—7 of Fig. 1, showing the pedestal assembly of a driven unit;

Fig. 8 is an elevational side view of the same taken substantially on line 8—8 of Fig. 7; and Fig. 9 is an elevational rear view of the same taken substantially on line 9—9 of Fig. 8.

Figure 1:
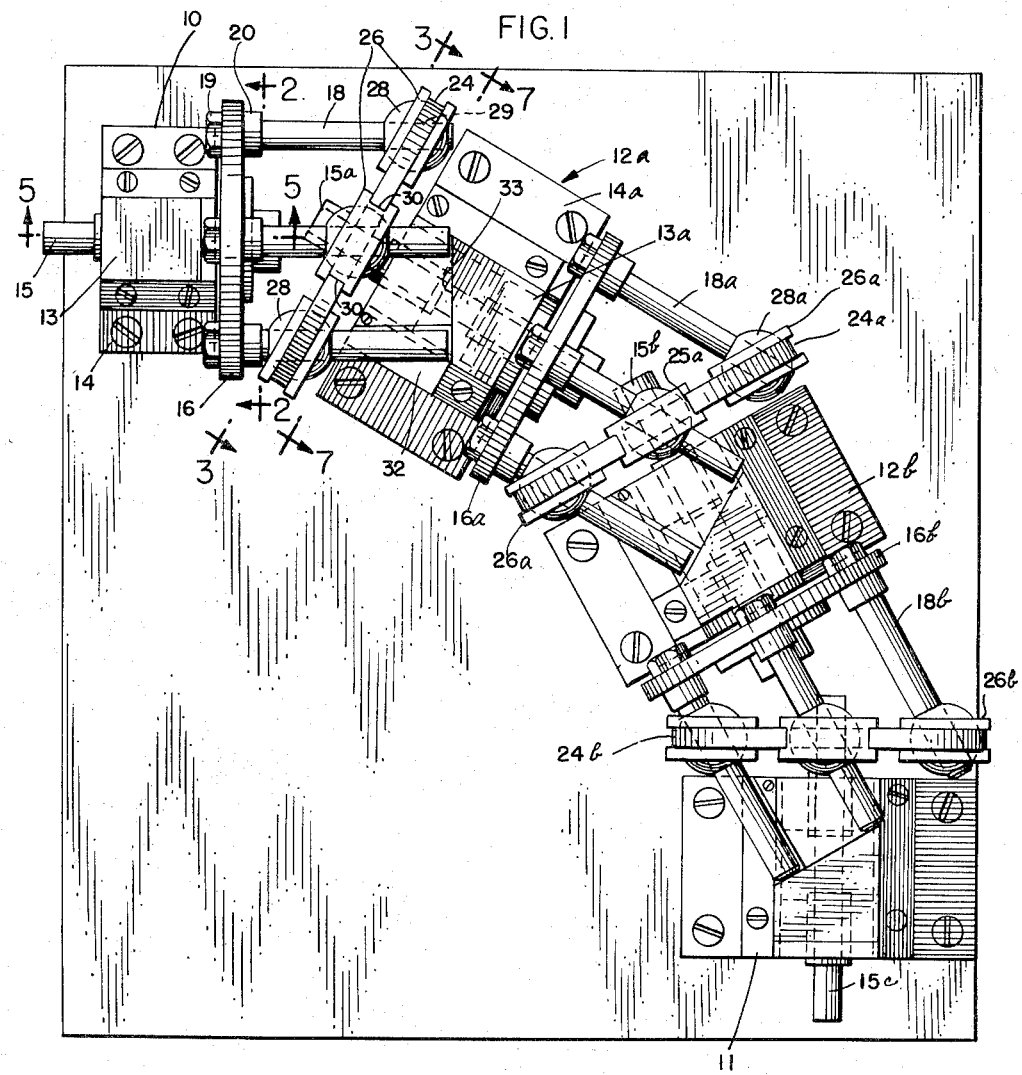
Fig. 1 is a plan view of a power transmission apparatus made in accordance with my present invention.

Referring now to the drawings and more particularly to Fig. 1, the power transmission apparatus of the present invention comprises, in general, a driving unit 10 and a driven unit 11 disposed at an angle to the driving unit 10 and connected by a series of connector units 12a and 12b. In the present instance, the angle between the unit 10 and the unit 11 is 90° and two connector units are employed. Power may be transmitted, however, at any desirable angle by varying the number of the connector units 12a and 12b or by varying the axially angular relation in these connector elements each to the other and to the driving unit 10 or the driven unit 11. In the present instance, the connector element 12a is disposed at an angle of approximately 30° from the driving unit 10, and the connector element 12b is arranged at a similar angle to the connector element 12a and to the driven unit 11. If transmission is desired at an angle of 60°, or between 30° and 60°, from the driving unit 10, for example, the connector unit 12b may be omitted, and the driven unit 11 placed in its stead. Or, if the transmission angle is to be 30° or less, both units 12a and 12b may be omitted and only units 10 and 11 employed. Thus, any adjacent two of the units 10, 11, 12a or 12b may be considered to be a transmission stage.

As shown, the driving unit 10 comprises a bearing block 13 mounted on a suitable pedestal 14 which is rigidly fixed in position on a suitable base. Journaled in the bearing block 13 is a shaft 15 which is rotated by any suitable source of power applied to its rearward end and a driving disc 16 is mounted on the forward end of shaft 15. This driving disc is provided with a plurality of circumferentially spaced openings 17, see Fig. 5, for reception of drive rods 18 which extend perpendicularly to the free face of the disc 16. The rods 18 are retained in position by means of nuts 19 and integral collars 20. As shown best in Figs. 5 and 6, the adjacent face of the bearing block 13 is recessed as at 22 and 23 to permit clearance of the nuts 19 during rotation of the disc 16. By this arrangement, as will be hereafter apparent, the several units of the present power transmission may be arranged within a reasonably limited space.

According to the present invention the driving unit 10 is operative to drive the connector unit 12a without any backlash whatsoever and with a minimum amount of noise. To this end, the connector unit 12a is provided with a shaft 15a to the rearward end of which is suitably secured a spider disc 24 having a plurality of radial slots 25 extending inwardly from its periphery, said slots being angularly spaced to correspond in number and position with the rods or bars 18, as best seen in Fig. 3. Mounted for sliding movement in a radial direction in each of said slots is a bearing block 26, as shown best in Figs. 3 and 4. Each of the bearing blocks 26 is provided with a spherical socket 27 contoured to correspond to the configuration of a ball bearing 28 and a pair of elongated channels or guideways 30 in opposite side edges for reception of the marginal edges of the slots 25. Each of the ball bearings 28 has a central bore 29 in which one of the rods 18 is received concentrically.

As the disc 16 is rotated, the ball bearings 28 slide axially of the rods 18 and travel about an elliptical orbit in a plane parallel to the plane of the disc 24. The radial sliding movement afforded by the bearing blocks 26 affords the requisite rigid connection between the rods 18 and the disc 24 to eliminate backlash and yet the necessary outward movement of the ball bearings because of the fact that the maximum diameter of the orbit of these ball bearings is greater than the radial distance between the centers of the rods 18. The rods 18 and the sockets 27 and 29 may be accurately machined so that a constant relation is maintained between these elements at all times.

The body of the connector unit 12a is formed similarly to the driving unit 10 and includes a bearing box 13a supported by a pedestal 14a. In order, however, to obtain compactness of the present transmission apparatus, the bearing box 13a and pedestal 14a are cut away on the rearward side, as at 32 and 33, to afford clearance for rotation of the rods 18, in the position of maximum angularity shown, so that the space between the disc 24 and the pedestal and bearing box may be reduced to a minimum. This cutaway formation is shown in Figs. 1, 7 and 8.

At the opposite end of the shaft 15a of the unit 12a is a drive disc 16a to which are secured spaced rods 18a, as in the driving unit 10. Ball bearings 28a are slidably mounted on these rods and are universally mounted in bearing blocks 26a which, in turn, are slidably mounted in slots 25a in a disc 24a. The disc 24a is suitably connected to or is mounted on and drives the shaft 15b of the connector unit 12b which, in turn, drives a disc 16b having spaced rods 18b for driving, in the same manner, a slotted disc 24b which drives a shaft 15c of the driven unit 11. The connector element 12b and the driven unit 11 have their pedestals and bearing blocks cut away in the same manner as the unit 12a so that compactness of the entire transmission train is afforded. To the same end, the forward faces of the pedestals and bearing blocks are provided with annular recesses as in the case of the unit 10, to afford a closer relation with the discs 16a and 16b. Also, it will be understood that each of the discs, both driving and driven, is provided with hub means for fixed attachment to respective shafts.

As the shaft 15 is rotated by a suitable power source, the disc 16 and the rods 18 are rotated about a common axis. This movement effects angular movement of the ball bearings 28, and since these ball bearings are slidably mounted on the rods 18 they are capable of moving in a plane that is at an angle to the axis of rotation. Thus, because of the axially angular disposition of the disc 24, in which the ball bearings 28 are held by the bearing blocks 26, the ball bearings necessarily move axially back and forth on the rods 18 and with respect to the disc 16. The radially sliding relation of the bearing blocks 26 with respect to the disc 24 permits a firm connection between the rods 18 and the disc 24 which is wholly free from backlash, and at the same time necessary elliptical movement of the ball bearings 28 about the axis of the disc 16 is accommodated. By this arrangement, also, torque transmission with much greater angular precision heretofore possible by the use of gear trains is accomplished because of the fact that the transmission is effected through a plurality of close fitting sliding joints which may be conveniently adjusted to conform to substantially any condition of axial angularity. In addition, the large contact areas between the rods 18 and the ball bearings 28 and between the bearings 28 and the slide blocks 26 facilitate simple and effective lubrication. For instance, the rods 18 may be simply coated with a light film of oil which would tend to suffice for large periods of time without attention and without becoming contaminated. In the alternative, the entire transmission assembly may be partially immersed in an oil bath wherein the rotation of the rods would provide an efficient splash lubrication system, or the assembly may be entirely enclosed in oil or other lubricant.

While a more or less permanent arrangement of the driving unit 10, the driven unit 11 and the several connector elements is contemplated, the axially angular relation of these elements may be varied at will to meet particular requirements. Also, it will be understood that a complete transmission train may be formed of connector units alone, omitting the particular driving and driven units 10 and 11 shown. Thus a single connector unit comprising a suitably journaled shaft, a drive disc having the axially extending rods, a driven radially slotted spider mounted on the rods by means of the bearing blocks and the bearing balls slidably threaded on the rods, and a driven shaft connected to the spider may constitute a complete axially angular power transmission device.

The present apparatus is characterized by a lack of need of attention and is capable of transmitting either intermittent or continuous power loads over long periods of time. Also, because of the fact that the load areas are large, wearing of the engaging elements is minimized and the improved drive is thus capable of precision operation with zero backlash as is necessary in computers and other apparatus where error must be obviated.

Although but one specific embodiment of this invention has been herein shown and described it will be understood that numerous details of the construction shown may be altered or omitted without departing from the spirit of the invention as defined by the following claims.

I claim:

1. Apparatus for axially angular transmission of power comprising a driving shaft, a first disc driven by said shaft, a plurality of angularly spaced elongated rods mounted on said disc and extending perpendicularly from one face thereof, a ball bearing slidably mounted on each of said rods, a second disc disposed at a predetermined angle axially with respect to said first disc, said second disc having a plurality of radial slots extending inwardly from the periphery thereof and corresponding in number and position to the said rods, a radially slidable bearing block mounted in each of said slots and having a spherical seat for receiving rotatably one of said ball bearings, and a driven shaft operatively connected to said second disc, whereby rotary motion is imparted to said driven shaft upon rotation of said driving shaft.

2. Apparatus for axially angular transmission of power comprising a plurality of stages angularly offset axially with respect to each other, each of said stages comprising a driving shaft, a first disc driven by said shaft, a plurality of angularly spaced elongated rods mounted on said disc and extending perpendicularly from one face thereof, a ball bearing slidably mounted on each of said rods, a second disc disposed at a predetermined angle axially with respect to said first disc, said second disc having a plurality of radial slots extending inwardly from the periphery thereof and corresponding in number and position to the said rods, a radially slidable bearing block mounted in each of said slots and having a spherical seat for receiving rotatably one of said ball bearings, and a driven shaft operatively connected to said second disc, whereby rotary motion is imparted to said driven shaft upon rotation of said driving shaft.

3. Apparatus for axially angular transmission of power comprising a driving shaft, a first disc driven by said shaft, a plurality of angularly spaced elongated rods secured to said disc and extending perpendicularly from one face thereof, a ball bearing slidably mounted coaxially on each of said rods, a second disc disposed at a predetermined angle axially with respect to said first disc, said second disc having a plurality of radial slots extending inwardly from the periphery thereof and corresponding in position and number to said rods, a bearing block mounted in each of said slots and having guideways in opposed edges for slidably receiving the respective margins of said slots, said bearing blocks each having an opening to receive and retain for universal movement therein one of said ball bearings, and a driven shaft operatively connected to said second disc, whereby rotary motion is imparted to said driven shaft upon rotation of said driving shaft.

4. Apparatus for axially angular transmission of power comprising a support and a driving shaft journaled therein, a first disc concentrically mounted on the forward end of said shaft, a plurality of angularly spaced elongated rods secured to said disc equidistant from the axis thereof and extending perpendicularly from the forward face of said disc, a ball bearing slidably mounted concentrically on each of said rods, a second disc having a plurality of radial slots of a number and angular spacing corresponding to the number of said rods, said second disc being disposed with said rods extending through said slots, a bearing block mounted in each of said slots for radial sliding movement therealong and having a socket receiving and rotatably retaining a respective one of said ball bearings, and means for operatively connecting said second disc to a shaft to be driven.

5. Apparatus for axially angular transmission of power comprising a plurality of transmission units disposed serially with their axes intersecting, each of said units comprising a support and a driving shaft journaled therein, a first disc concentrically mounted on the forward end of said shaft, a plurality of angularly spaced elongated rods secured to said disc equidistant from the axis thereof and extending perpendicularly from the forward face of said disc, a ball bearing slidably mounted concentrically on each of said rods, a second disc having a plurality of radial slots of a number and angular spacing corresponding to the number of said rods, said second disc being disposed with said rods extending through said slots, a bearing block mounted in each of said slots for radial sliding movement therealong and having a socket receiving said rotatably retaining a respective one of said ball bearings, means for operatively connecting the second disc of one unit to the rearward portion of the shaft of the next successive unit, and means for operatively connecting the second disc of the last unit of the series to a shaft to be ultimately driven.

6. Apparatus for axially angular transmission of power comprising a driving shaft, a first disc mounted on the forward end of said shaft in a plane normal thereto, a plurality of angularly spaced elongated rods secured to said disc equidistant from the axis of said shaft and extending perpendicularly from the forward face of said disc, a spherical bearing slidably mounted on each of said rods, each of said bearings having a concentric bore for a sliding fit with the respective rod, a second disc having a plurality of radial slots of a number and angular spacing corresponding to the number of said rods, said rods extending through the respective slots of said second disc, a bearing block in each of said slots having guideways in opposed edges for receiving the margins of said slots and for radial sliding movement therealong, each of said bearing blocks having a spherically contoured socket for receiving and retaining a respective one of said ball bearings, and means for operatively connecting said second disc to a driven shaft disposed at an angle to the axis of said driving shaft, whereby rotary motion is imparted to said driven shaft by said driving shaft.

7. Apparatus for axially angular transmission of power comprising a pair of transmission units arranged serially and with their axes intersecting in a common plane, each of said units comprising a driving shaft, a first disc mounted on the forward end of said shaft in a plane normal thereto, a plurality of angularly spaced elongated rods secured to said disc equidistant from the axis of said shaft and extending perpendicularly from the forward face of said disc, a spherical bearing slidably mounted on each of said rods, each of said bearings having a concentric bore for a sliding fit with the respective rod, a second disc having a plurality of radial slots of a number and angular spacing corresponding to the number of said rods, said rods extending through the respective slots of said second disc, a bearing block in each of said slots having guideways in opposed edges for receiving the margins of said slots and for radial sliding movement therealong, each of said bearing blocks having a spherically contoured socket for receiving and retaining a respective one of said ball bearings, means for operatively connecting said second disc of the first unit with the rearward end of the shaft of the second unit, and means for connecting the second disc of the second unit to a shaft to be driven.

8. Apparatus for axially angular transmission of power comprising a plurality of successive axially intersecting transmission stages, each of said stages comprising a driving shaft, a support means for journalling said driving shaft, a first disc normal to the axis of and driven by said shaft, a plurality of parallel angularly spaced elongated rods secured to said disc radially equidistant from the axis thereof and extending perpendicularly forward therefrom, a spherical bearing member slidably mounted concentrically on each of said rods, a second disc having a plurality of radial slots corresponding in number and angular position to the said rods, a bearing block slidably mounted in each of said slots for radial movement therein, said bearing block having a spherically walled opening therethrough, and one of said spherical bearings being rotatably secured in the opening of each bearing block whereby said second disc is connected with said rods, means for operatively connecting the second disc of one stage to the shaft of the next succeeding stage, and means for connecting the second disc of the last stage to a shaft to be ultimately driven.

9. Apparatus for axially angular transmission of power comprising a driving shaft, a support means for journalling said driving shaft, a first disc normal to the axis of and driven by said shaft, a plurality of parallel angularly spaced elongated rods secured to said disc radially equidistant from the axis thereof and extending perpendicularly forward therefrom, a spherical bearing member slidably mounted concentrically on each of said rods, a second disc having a plurality of radial slots corresponding in number and angular position to the said rods, a bearing block slidably mounted in each of said slots for radial movement therein, said bearing block having a spherically walled opening therethrough, and one of said spherical bearings being rotatably secured in the opening of each bearing block whereby said second disc is connected with said rods, and means for operatively connecting said second disc to a shaft to be driven.

10. Apparatus for axially angular transmission of power comprising a driving shaft, a support means for journalling said driving shaft, a first disc mounted on the forward end of and disposed normal to the axis thereof, a plurality of parallel angularly spaced elongated rods extending perpendicularly from the forward face of said first disc, said rods being equidistant from the axis of said shaft, a spherical bearing slidably mounted concentrically on each of said rods, a second disc disposed at an angle with respect to the plane of said first disc and with its axis intersecting the axis of the first disc, said second disc having a plurality of angularly spaced radial slots extending inwardly from the periphery thereof, said slots corresponding in number and spacing to the said rods, a bearing block slidably mounted in each of said slots for radial movement therein, each of said bearing blocks having a central spherically walled opening therethrough for reception and universally movable retention of one of said spherical bearings, each of said spherical bearings being mounted in the opening of a respective bearing block to operatively connect said second disc to said rods, and a coaxially mounted driven shaft operatively connected to said second disc.

References Cited in the file of this patent
UNITED STATES PATENTS

| | | |
|---|---|---|
| 659,827 | Putnam | Oct. 16, 1900 |
| 2,022,909 | Glen | Dec. 3, 1935 |
| 2,762,210 | Redard | Sept. 11, 1956 |